US007618490B2

(12) United States Patent

Nakashima et al.

(10) Patent No.: US 7,618,490 B2
(45) Date of Patent: Nov. 17, 2009

(54) SPRAYING MATERIAL AND SPRAY TECHNIQUE EMPLOYING THE SAME

(75) Inventors: Yasuhiro Nakashima, Itoigawa (JP); Shunichi Mishima, Itoigawa (JP); Masahiro Iwasaki, Itoigawa (JP); Isao Terashima, Itoigawa (JP); Atsumu Ishida, Itoigawa (JP); Takamitsu Murokawa, Itoigawa (JP); Tomohito Kobayashi, Itoigawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 562 days.

(21) Appl. No.: 10/557,204

(22) PCT Filed: Aug. 19, 2004

(86) PCT No.: PCT/JP2004/012247

§ 371 (c)(1), (2), (4) Date: Nov. 17, 2005

(87) PCT Pub. No.: WO2005/019131

PCT Pub. Date: Mar. 3, 2005

(65) Prior Publication Data

US 2007/0054059 A1 Mar. 8, 2007

(30) Foreign Application Priority Data

| | | |
|---|---|---|
| Aug. 20, 2003 | (JP) | 2003-295994 |
| Aug. 20, 2003 | (JP) | 2003-295995 |
| Aug. 20, 2003 | (JP) | 2003-296169 |
| Aug. 20, 2003 | (JP) | 2003-296170 |
| Aug. 20, 2003 | (JP) | 2003-296171 |

(51) Int. Cl.
*C04B 22/00* (2006.01)

(52) U.S. Cl. ....................... 106/724; 106/692; 106/727; 106/819

(58) Field of Classification Search ................. 106/724, 106/727, 819, 823, 692
See application file for complete search history.

(56) References Cited

U.S. PATENT DOCUMENTS

| | | | | |
|---|---|---|---|---|
| 6,537,367 | B2 * | 3/2003 | Sommer et al. | 106/724 |
| 6,540,826 | B2 * | 4/2003 | Sommer et al. | 106/724 |
| 7,182,808 | B2 * | 2/2007 | Angelskaar et al. | 106/823 |
| 7,198,669 | B2 * | 4/2007 | Angelskaar et al. | 106/823 |
| 2007/0044686 | A1 * | 3/2007 | Angelskaar | 106/727 |
| 2007/0056473 | A1 * | 3/2007 | Nakashima et al. | 106/627 |

FOREIGN PATENT DOCUMENTS

| | | |
|---|---|---|
| CN | 1407954 | 4/2003 |
| JP | 60 4149 | 2/1985 |
| JP | 9 19910 | 1/1997 |
| JP | 10 87358 | 4/1998 |
| JP | 2001 130935 | 5/2001 |
| JP | 2001 159239 | 6/2001 |
| JP | 2001 509124 | 7/2001 |
| JP | 2001 261393 | 9/2001 |
| JP | 2002 47048 | 2/2002 |
| JP | 2002 80250 | 3/2002 |
| JP | 2002 226247 | 8/2002 |
| JP | 2004 35387 | 2/2004 |

OTHER PUBLICATIONS

U.S. Appl. No. 10/557,238, filed Nov. 17, 2005, Nakashima et al.

* cited by examiner

*Primary Examiner*—Paul Marcantoni
(74) *Attorney, Agent, or Firm*—Oblon, Spivak, McClelland, Maier & Neustadt, L.L.P.

(57) ABSTRACT

To provide a spraying material having an excellent quick-setting property and excellent adherability, a small alkali amount and excellent initial strength development, and a spraying method using it.

The spraying material comprises a liquid quick-setting admixture containing an aluminum source, a sulfur source and a fluorine source, one or more quick-setting aids selected from the group consisting of calcium aluminate, calcium sulfoaluminate, calcium aluminosilicate, an alkali metal-containing substance, calcium hydroxide and aluminum hydroxide, and a cement concrete, and the method is to spray this spraying material.

20 Claims, No Drawings

SPRAYING MATERIAL AND SPRAY TECHNIQUE EMPLOYING THE SAME

TECHNICAL FIELD

The present invention relates to a spraying material sprayed to a surface of exposed ground of e.g. slopes or tunnels, such as road tunnels, railway tunnels or channel tunnels, and a spraying method using it.

BACKGROUND ART

Heretofore, methods of spraying a quick-setting concrete in which a powder quick-setting admixture was admixed with a concrete, were applied to prevent break and fall of ground exposed in excavation works of tunnels or the like (cf. JP-B-60-004149 and JP-A-09-019910).

These spraying methods employed a quick-setting admixture in which an alkali metal aluminate, an alkali metal carbonate or the like was admixed with calcium aluminate because of its excellent quick-setting property.

However, there has been an increasing demand for a quick-setting admixture having a pH-value lower than that of the quick-setting admixture in which an alkali metal aluminate, an alkali metal carbonate or the like was admixed with calcium aluminate, and being weakly alkaline, preferably neutral or weakly acidic.

Liquid quick-setting admixtures proposed for this purpose include one composed mainly of a basic aluminum salt and an organic carboxylic acid (cf. JP-A-2001-509124), one composed mainly of aluminum sulfate and an alkanolamine (cf. JP-A-10-087358) and one composed mainly of a basic aqueous solution of aluminum, lithium silicate, and lithium aluminate (cf. JP-A-2001-130935).

However, these liquid quick-setting admixtures had problems that it is hard to achieve satisfactory initial strength development and that it is not easy to realize heavy-spraying in a tunnel, as compared with the conventional powder-type quick-setting admixtures.

Furthermore, quick-setting admixtures containing fluorine in addition to aluminum sulfate were developed as acidic liquid quick-setting admixtures with an increased quick-setting property (cf. JP-A-2002-080250, JP-A-2002-047048 and JP-A-2004-035387).

However, there were desires for further improvement in the quick-setting property, improvement in the adherability in a spring place, and so on for practical use. In addition, expectations were recently high for development of a liquid quick-setting admixture having less effect on the human body and better initial strength development than those of the conventional basic quick-setting admixtures.

DISCLOSURE OF THE INVENTION

Under the above-mentioned circumstances, the present inventors have been conducted extensive studies to overcome the above problems and, as a result, have found that a spraying material with a small alkali amount and an excellent initial strength development could be obtained with use of a spraying material having a specific composition, and the present invention has been accomplished on the basis of this discovery.

The present invention resides in the following gists.

(1) A spraying material comprising: a liquid quick-setting admixture containing an aluminum source, a sulfur source and a fluorine source; one or more quick-setting aids selected from the group consisting of calcium aluminate, calcium sulfoaluminate, calcium aluminosilicate, an alkali metal-containing substance, calcium hydroxide and aluminum hydroxide; and a cement concrete.

(2) The spraying material according to the above (1), wherein the aluminum source in the liquid quick-setting admixture is contained in an amount of from 25 to 110 parts as $Al_2O_3$ relative to 100 parts of the sulfur source as $SO_3$.

(3) The spraying material according to the above (1) or (2), wherein the fluorine source in the liquid quick-setting admixture is contained in an amount of from 2 to 50 parts as F relative to 100 parts of the sulfur source as $SO_3$.

(4) The spraying material according to any one of the above (1) to (3), wherein the liquid quick-setting admixture further contains an alkanolamine.

(5) The spraying material according to the above (4), wherein the alkanolamine is contained in an amount of from 1 to 30 parts relative to 100 parts of the sulfur source as $SO_3$.

(6) The spraying material according to any one of the above (1) to (5), wherein the liquid quick-setting admixture further contains an alkali metal source.

(7) The spraying material according to the above (6), wherein the alkali metal source is contained in an amount of from 2 to 50 parts as $R_2O$, where R represents an alkali metal, relative to 100 parts of the sulfur source as $SO_3$.

(8) The spraying material according to any one of the above (1) to (7), wherein the liquid quick-setting admixture has a pH of at most 6.

(9) The spraying material according to any one of the above (1) to (8), wherein the liquid quick-setting admixture is used in an amount of from 5 to 15 parts relative to 100 parts of the cement in the cement concrete.

(10) The spraying material according to any one of the above (1) to (9), wherein the quick-setting aid is used in an amount of from 0.05 to 25 parts relative to 100 parts of the cement in the cement concrete.

(11) The spraying material according to any one of the above (1) to (10), wherein the quick-setting aid has a Blaine specific surface area of at least 2000 $cm^2/g$.

(12) The spraying material according to any one of the above (1) to (11), wherein calcium sulfoaluminate as the quick-setting aid contains from 30 to 50 parts of CaO, from 40 to 60 parts of $Al_2O_3$ and from 5 to 20 parts of $SO_3$.

(13) The spraying material according to any one of the above (1) to (12), wherein calcium aluminosilicate as the quick-setting aid contains from 20 to 60 parts of CaO, from 2 to 60 parts of $Al_2O_3$ and from 6 to 50 parts of $SiO_2$.

(14) The spraying material according to any one of the above (1) to (13), further comprising calcium sulfate.

(15) The spraying material according to the above (14), wherein calcium sulfate is contained in an amount of from 1 to 7 parts relative to 100 parts of the cement in the cement concrete.

(16) The spraying material according to any one of the above (1) to (15), further comprising a retarder.

(17) The spraying material according to the above (16), wherein the retarder is contained in an amount of from 0.05 to 5 parts relative to 100 parts of the cement in the cement concrete.

(18) A spraying method using the spraying material as defined in any one of the above (1) to (17).

(19) The spraying method according to the above (18), which comprises adding the liquid quick-setting admixture and the quick-setting aid, and calcium sulfate as the case requires, to the cement concrete fed under pressure, and spraying the mixture.

(20) The spraying method according to the above (18) or (19), which comprises preliminarily admixing the quick-setting aid, and calcium sulfate as the case requires, with the cement concrete, adding the liquid quick-setting admixture to the cement concrete fed under pressure, and spraying the mixture.

BEST MODE FOR CARRYING OUT THE INVENTION

Now, the present invention will be explained in detail.

The term "cement concrete" in the present invention is a generic term for a cement material including cement paste, mortar and concrete. Furthermore, "part" and "%" in the present invention are based on mass unless otherwise defined in particular.

A liquid quick-setting admixture in a spraying material according to the present invention contains an aluminum source, a sulfur source and a fluorine source, and preferably further contains an alkanolamine and an alkali metal source.

There are no particular restrictions on the aluminum source (aluminum-supplying raw material) in the present invention, and the aluminum source may be selected from compounds such as amorphous or crystalline aluminum hydroxides, sulfate of aluminum, aluminates, other inorganic or organic aluminum compounds, and aluminum complexes, and can be one or more kinds of these compounds. Among others, it is preferable in the present invention to use sulfate of aluminum which also serves as a sulfur source.

Furthermore, there are no particular restrictions on the sulfur source (sulfur-supplying raw material), and the sulfur source may be selected from compounds such as sulfides, sulfuric acid or sulfates, sulfurous acid or sulfites, thiosulfuric acid or thiosulfates, and organic sulfur compounds, in addition to sulfur in an elemental state such as sulfur or sublimed sulfur, and can be one or more kinds of them. Among these, it is preferable to use sulfuric acid or a sulfate, because of their high solubility to water, low production cost and excellent quick-setting property. In particular, among the sulfates, it is preferable to use an alum compound that also contains aluminum and an alkali metal element.

There are no particular restrictions on the fluorine source (fluorine-supplying raw material) as long as it is dissolved or dispersed in a solvent or water. It may be selected from organic fluorine compounds, fluorides, silicofluorides and fluoborates, and can be one or more kinds of them. Among others, it is preferable to use a fluoride, a silicofluoride or a fluoborate, because of no toxicity, no risk of explosion, low production cost and excellent quick-setting property.

The alkanolamine preferably contained in the liquid quick-setting admixture of the present invention, is preferably one having an N—R—OH structure in its structural formula. R here is an atomic group referred to as an alkylene group or an arylene group. Examples of the alkylene group include linear type groups such as a methylene group, an ethylene group and an n-propylene group or groups having branched-structures, such as an isopropylene group. Examples of the arylene group include groups having an aromatic ring such as a phenylene group and a tolylene group. Furthermore, R may be bonded to the nitrogen atom through at least two bonds and a part or the whole of R may be of a cyclic structure. R may be bonded to a plurality of hydroxyl groups and the alkylene group may contain an element other than carbon and hydrogen, e.g., sulfur, fluorine, chlorine, oxygen, or the like, in a part of the structure.

Examples of the alkanolamine include ethanolamine, diethanolamine, triethanolamine, N-methyldiethanolamine, N,N-dimethylethanolamine, N,N-dibutylethanolamine, N-(2-aminoethyl)ethanolamine, boron trifluoride triethanolamine, and derivatives thereof. The present invention can employ one or more kinds among them. Among others, it is preferable to use diethanolamine, N,N-dimethylethanolamine, and a mixture thereof it is particularly preferable to use the mixture of diethanolamine and N,N-dimethylethanolamine.

There are no particular restrictions on the alkali metal source (alkali metal-supplying raw material) preferably contained in the liquid quick-setting admixture of the present invention, and it is preferably a water-soluble compound containing an alkali metal element, i.e., lithium, sodium, potassium, rubidium, or cesium. It is possible to use, for example, an oxide, a peroxide, a chloride, a hydroxide, a nitrate, a nitrite, a phosphate, an aluminate, a sulfate, a thiosulfate, a persulfate, a sulfide, a carbonate, a bicarbonate, an oxalate, a borate, a fluoride, a silicate, a silicofluoride, an alum, and a metal alkoxide of an alkali metal element. The alkali metal source can be one or two kinds among them.

In preparation of the liquid quick-setting admixture of the present invention, there are no particular restrictions on a method of mixing the raw materials of the above-mentioned aluminum source, sulfur source, and fluorine source and, preferably, mixing an additional raw material of the alkanolamine, the alkali metal source or an oxycarboxylic acid thereto.

There are no particular restrictions on the contents of the aluminum source, sulfur source and fluorine source in the liquid quick-setting admixture, and the higher the contents, the better the quick-setting property. Thus, the aluminum source is preferably contained in an amount of from 25 to 110 parts as $Al_2O_3$ and the fluorine source is preferably contained in an amount of from 2 to 50 parts, relative to 100 parts of the sulfur source as $SO_3$.

Furthermore, in a case where the alkanolamine is used, the alkanolamine is preferably contained in an amount of from 1 to 30 parts relative to 100 parts of the sulfur source as $SO_3$.

In a case where the alkali metal source is used, it is preferably contained in an amount of from 2 to 50 parts as $R_2O$, where R represents an alkali metal, relative to 100 parts of the sulfur source as $SO_3$.

The reason why the upper limit of the content is defined for each component contained in the liquid quick-setting admixture is that the viscosity of the liquid becomes too high or that the long-term stability becomes worse, but not that an excessive amount brings an adverse effect on the quick-setting property.

The liquid quick-setting admixture of the present invention can contain any component other than the above components to the extent that it does not significantly degrade the effect of the present invention.

Furthermore, the liquid quick-setting admixture of the present invention can contain a known water-soluble hydration accelerator. It is possible to use as the hydration accelerator, for example, an organic hydration accelerator such as formic acid or its salt, acetic acid or its salt, or lactic acid or its salt, or an inorganic hydration accelerator such as liquid glass, a nitrate, a nitrite, a thiosulfate or a thiocyanate.

The solid content of the liquid quick-setting admixture is preferably from 20 to 60%, more preferably from 25 to 50%. If the solid content is less than 20%, the excellent quick-setting property cannot be obtained in some cases. On the other hand, if the solid content exceeds 60%, the viscosity of the liquid is too high and the pressure-feeding property with a pump becomes worse in some cases.

The liquid quick-setting admixture of the present invention is preferably acidic, and the pH thereof is preferably at most 6, particularly preferably from 1.5 to 4.

The liquid quick-setting admixture of the present invention is in the form of a liquid including a suspension. There are no particular restrictions on the size of particles in the suspension and the size is preferably at most 5 μm from the viewpoint of the dispersibility of the suspended particles.

An amount of the liquid quick-setting admixture used in the present invention is preferably from 5 to 15 parts, more preferably from 7 to 10 parts, relative to 100 parts of the cement in the cement concrete. If the amount of the liquid quick-setting admixture used is less than 5 parts, the excellent quick-setting property cannot be exerted in some cases. On the other hand, if it exceeds 15 parts, the long-term strength development becomes worse in some cases.

There are no particular restrictions on the content of the cement in the cement concrete in the present invention, and it is used preferably in an amount of at least 350 $kg/m^3$ from the viewpoint of excellent strength development. In addition, as a kind of the cement, it is possible to use one of various types of portland cements such as ordinary, early-strength, ultra early-strength, moderate-heat and low-heat cements, and various blended cements in which blast-furnace slag, fly ash or fine powder of limestone is blended with these portland cements. There are no particular restrictions on the ratio of the additives to the cement in the blended cements, and it is also possible to use a blended cement in which these additives are blended in amounts more than those defined in JIS.

The spraying material of the present invention contains at least one or more quick-setting aids selected from the group consisting of calcium aluminate, calcium sulfoaluminate, calcium aluminosilicate, an alkali metal-containing substance, calcium hydroxide and aluminum hydroxide in combination with the above-mentioned liquid quick-setting admixture. It is possible to maximize the quick-setting property of the liquid quick-setting admixture, by incorporating these quick-setting aids.

Furthermore, the use of these quick-setting aids might make the retention of fluidity of the base concrete worse in some cases, and in such cases it is preferable to further use a retarder in combination. It is preferable that the quick-setting aid and the retarder be preliminarily mixed in the base concrete for spraying.

There are no particular restrictions on the content of the quick-setting aid in the present invention, and the content is preferably from 0.05 to 25 parts, particularly preferably from 0.1 to 15 parts, relative to 100 parts of the cement in the cement concrete. Moreover, there are no particular restrictions on the particle size of the quick-setting aid and on its distribution, and the particle size is preferably at least 2000 $cm^2/g$, particularly preferably at least 3000 $cm^2/g$, as the Blaine specific surface area (hereinafter also referred to as "Blaine value").

Calcium aluminate to be used as the quick-setting aid can enhance the initial strength development when reacting with the liquid quick-setting admixture, and it is preferably one obtained by subjecting a mixture of a CaO raw material, an $Al_2O_3$ raw material, and so on, to a heat treatment such as calcination in a kiln or melting in an electric furnace, and pulverizing the resultant. Namely, where CaO is abbreviated as "C" and $Al_2O_3$ as "A", calcium aluminate may be selected, for example, from $C_3A$, $C_{12}A_7$, $C_{11}A_7.CaF_2$, $C_{11}A_7.CaCl_2$, CA, and $CA_2$. It is possible to use one of them or to use at least two of them in combination. Furthermore, it is also possible to use those in which an alkali metal such as Na, K, or Li is solid-solubilized in an amount of from 0.05 to 5%, or those in which $SiO_2$ is contained as a mineralizer in an amount of less than 6%. In addition, it is also possible to use one containing Mg or Mn.

The calcium aluminate can be either an amorphous one or a crystalline one, or a mixture thereof.

There are no particular restrictions on the particle size of the calcium aluminate and its distribution, and the particle size is preferably at least 3,000 $cm^2/g$, more preferably at least 5,000 $cm^2/g$, as the Blaine value, from the viewpoint of the initial strength development. If it is less than 3,000 $cm^2/g$, the excellent quick-setting property cannot be obtained in some cases.

There are no particular restrictions on the amount of calcium aluminate used, and the amount is preferably from 1 to 10 parts, more preferably from 2 to 5 parts, relative to 100 parts of the cement. If the amount is less than 1 part, the excellent quick-setting property cannot be obtained in some cases. On the other hand, if it exceeds 10 parts, the retention of fluidity of the concrete might be deteriorated in some cases.

The calcium sulfoaluminate (hereinafter referred to as "CSA") to be used in the present invention enhances the initial strength development when reacting with the liquid quick-setting admixture. It is preferably one obtained by subjecting a mixture of a CaO raw material, an $Al_2O_3$ raw material, a $CaSO_4$ raw material, and so on, to a heat treatment such as calcination in a kiln, followed by pulverization of the resultant, and it is a CaO—$Al_2O_3$—$SO_3$ type mineral.

A preferred chemical composition of CSA is one comprising from 30 to 50 parts of CaO, from 40 to 60 parts of $Al_2O_3$ and from 5 to 20 parts of $SO_3$, and CSA can further contain less than 10 parts of a component such as MgO, $SiO_2$, or $Fe_2O_3$ in addition to those. CSA can further contain an alkali metal solid-solubilized therein. It is preferable to use hauyne ($3CaO.3Al_2O_3.CaSO_4$) by virtue of its excellent quick-setting and strength development properties.

There are no particular restrictions on the particle size of CSA and its distribution, and the particle size is preferably at least 2,000 $cm^2/g$ as the Blaine value from the viewpoint of the initial strength development, more preferably at least 3,000 $cm^2/g$. If it is less than 2,000 $cm^2/g$, the excellent quick-setting or strength development property cannot be obtained in some cases.

There are no particular restrictions on the amount of CSA used, and it is preferably from 1 to 20 parts relative to 100 parts of the cement, more preferably from 2 to 10 parts. If the amount is less than 1 part, the excellent quick-setting property cannot be obtained in some cases. On the other hand, if it exceeds 20 parts, the retention of fluidity of the cement concrete might be deteriorated in some cases.

The calcium aluminosilicate (hereinafter referred to as "CAS") to be used in the present invention enhances the initial strength development when reacting with the liquid quick-setting admixture. It is preferably one obtained by subjecting a mixture of a CaO raw material, an $Al_2O_3$ raw material, an $SiO_2$ raw material, and so on, to a heat treatment such as calcination in a kiln or melting in an electric furnace, and pulverizing the resultant. CAS has a chemical composition of from 20 to 60 parts of CaO, from 2 to 60 parts of $Al_2O_3$ and from 6 to 50 parts of $SiO_2$, and it can further contain one or more components selected from ferrous oxide, ferric oxide, manganese oxide, magnesia, phosphoric acid and an alkali metal in an amount of less than 30%.

It is possible to use various water-granulated and slow-cooling slags by-produced from a blast furnace and a steel plant, and the water-granulated slag is more preferred.

There are no particular restrictions on the particle size of CAS and its distribution, and the particle size is preferably at least 2,000 $cm^2/g$, more preferably at least 3,000 $cm^2/g$, as the Blaine value from the viewpoint of the initial strength development. If it is less than 2,000 $cm^2/g$, the excellent quick-setting or strength-development property cannot be obtained in some cases.

There are no particular restrictions on the amount of CAS used, and it is preferably from 1 to 25 parts relative to 100 parts of the cement, more preferably from 3 to 15 parts. If the amount is less than 1 part, the excellent quick-setting property cannot be obtained in some cases. On the other hand, if it exceeds 25 parts, the fluidity of the cement concrete might be deteriorated in some cases.

The present invention employs an alkali metal-containing substance as the quick-setting aid in order to enhance the initial strength development, and another reason for it is that it is difficult for the acidic liquid quick-setting admixture to have a great deal of an alkali metal dissolved therein in view of long-term stability of the liquid.

There are no particular restrictions on the alkali metal-containing substance (hereinafter referred to as "alkali substance"), and it may be a water-soluble compound containing an alkali metal element, i.e., lithium, sodium, potassium, rubidium or cesium. It is preferable to use an oxide, a peroxide, a chloride, a hydroxide, a nitrate, a nitrite, a phosphate, a silicate, an aluminate, a sulfate, a thiosulfate, a persulfate, a sulfide, a carbonate, a bicarbonate, an oxalate, a borate, a fluoride, a silicate, a silicofluoride, alum, burnt alum, or a metal alkoxide of an alkali metal element, and it is possible to use one kind or at least two kinds among them.

There are no particular restrictions on the amount of the alkali substance used, and it is preferably from 0.05 to 3 parts as $R_20$ (R: an alkali metal) relative to 100 parts of the cement. If the amount is less than 0.05 part, the excellent quick-setting property cannot be obtained in some cases. On the other hand, if it exceeds 3 parts, the retention of fluidity of the concrete might be deteriorated in certain cases.

Calcium hydroxide to be used as the quick-setting aid includes slaked lime produced in hydration of quick lime or carbide, and it is possible to use quick lime which generates a great amount of calcium hydroxide as a result of the aspect that the concrete uses water, or to use a combination of it with calcium hydroxide. There are no particular restrictions on the form of calcium hydroxide crystals.

Aluminum hydroxide to be used as the quick-setting aid is a substance such as $Al(OH)_3$ or $AlO(OH).nH_2O$. Aluminum hydroxide includes both crystalline and amorphous aluminum hydroxides, either of which can be used, and among which amorphous aluminum hydroxide is preferably used.

There are no particular restrictions on the degree of fineness of calcium hydroxide or aluminum hydroxide, and it is preferably at least 4,000 $cm^2/g$ as the Blaine value, more preferably at least 8,000 $cm^2/g$. If it is less than 4,000 $cm^2/g$, the excellent adherability to ground in spraying cannot be obtained in some cases.

There are no particular restrictions on the amounts of calcium hydroxide and/or aluminum hydroxide used, and they are preferably used in an amount of from 0.5 to 5 parts, more preferably from 0.8 to 3 parts, relative to 100 parts of the cement. If the amount is less than 0.5 part, the excellent adherability to ground in spraying cannot be obtained in some cases. On the other hand, if it exceeds 5 parts, the long-term strength development might be deteriorated in some cases.

The spraying material of the present invention preferably contains a retarder. The term "retarder" is a generic term for those suppressing hydration when admixed with the cement, and it is used in order to retain the fluidity of concrete. It is possible to use an organic substance or an inorganic substance under general classification.

Specific examples of the organic substance include (1) high-molecular-weight organic acids such as lignin sulfonic acid, humic acid and tannic acid, or their salts, (2) oxycarboxylic acids such as citric acid, malic acid, tartaric acid, oxalic acid, malonic acid, succinic acid, glutaric acid, adipic acid, pimelic acid, maleic acid, fumaric acid, phthalic acid, arabonic acid, glucoheptonic acid and gluconic acid, or their salts, (3) keto acids such as 2-ketocarboxylic acid and urea, or their salts, (4) aminocarboxylic acids such as glutamic acid, or their salts, (5) polyalcohols, (6) monosaccharides such as glucose, fructose, gluconic lactone, galactose, sucrose, xylose, xylitol, abitose, ribose and an isomerized sugar, and di- or tri-saccharides such as oligosaccharide, (7) polysaccharides such as dextrin, hemicellulose, inulin, alginic acid, xylan and dextran, and (8) sugar alcohols such as sorbitol.

Specific examples of the inorganic substance usable herein include inorganic acids such as phosphoric acid and hydrofluoric acids, phosphates, zinc oxide, lead oxide, boric acid, silicofluorides such as magnesium silicofluoride and sodium silicofluoride, and fluorine-containing minerals such as cryolite and calcium fluoroaluminate. One kind or at least two kinds of them can be used in the present invention to the extent that the object of the present invention is not disturbed.

There are no particular restrictions on the amount of the retarder used, and the amount is preferably from 0.05 to 5 parts relative to 100 parts of the cement. If it is less than 0.05 part, the adequate retention of fluidity cannot be obtained in some cases. On the other hand, if it exceeds 5 parts, the adequate strength development cannot be obtained in some cases.

Furthermore, the spraying material of the present invention preferably contains calcium sulfate as a strength improver. Calcium sulfate may be, for example, anhydrous gypsum, hemihydrate gypsum or gypsum dihydrate, and one kind or at least two kinds among them can be used.

There are no particular restrictions on the crystal configuration of calcium sulfate, and it is possible to use one of α-type hemihydrate gypsum, β-type hemihydrate gypsum, I-type anhydrous gypsum, II-type anhydrous gypsum and III-type anhydrous gypsum.

In addition, these calcium sulfates include one naturally produced, and FGD gypsum and hydrofluoric acid-by-product of anhydrous gypsum produced as industrial by-products.

The particle size of calcium sulfate is preferably at least 3,000 $cm^2/g$ as the Blaine value from the viewpoint of the strength development.

There are no particular restrictions on the amount of calcium sulfate used, and the amount is preferably from 1 to 7 parts relative to 100 parts of the cement, more preferably from 1.5 to 5 parts. If the amount is less than 1 part, the excellent strength development cannot be obtained in some cases. On the other hand, if it exceeds 7 parts, the mixture might expand in large excess to decrease the strength in some cases.

In addition to the above-mentioned materials and aggregates such as sand and gravel, the spraying material of the present invention can contain another admixture or additive such as siliceous powder, a water-reducing agent, an AE agent, a thickener, and fiber to the extent that the object of the present invention is not substantially disturbed.

The siliceous powder may be an industrial by-product such as silica fume or fly ash, or gel-type silica such as fumed silica, colloidal silica or precipitated silica. It is possible to use one kind or at least two kinds selected from the group of these silica raw materials.

The water-reducing agent can be any one of the known water-reducing agents of the lignin sulfonic acid type, the naphthalenesulfonic acid type, the polycarboxylic acid type, and so on.

The AE agent is used in order to prevent freezing damage of the concrete.

The thickener is used to improve the segregation resistance of the aggregate, cement paste or other additives, and, for example, it is possible to use a cellulose type thickener such as methylcellulose, carboxy methylcellulose or cellulose ether; a polymer such as polyethyleneoxide, polypropyleneoxide or polybutyleneoxide; or an acrylic polymer consisting mainly of a copolymer of acrylate or methacrylate.

The fiber is used to improve the impact resistance and elasticity of the cement concrete, and it is possible to use either inorganic fiber or organic fiber.

Examples of the inorganic fiber include glass fiber, carbon fiber, rock wool, asbestos, ceramic fiber and metal fiber.

Furthermore, examples of the organic fiber include vinylon fiber, polyethylene fiber, polypropylene fiber, polyacryl fiber, cellulose fiber, polyvinyl alcohol fiber, polyamide fiber, pulp, hemp, wood wool and wood chip, among which metal fiber or vinylon fiber is preferably used from the economical viewpoint.

The length of the fiber is preferably at most 50 mm, more preferably from 5 to 30 mm in terms of the pressure-feeding property, the mixing property, and so on. There are no particular restrictions on the aspect ratio of the fiber.

A method for spraying the spraying material of the present invention to a slope or a tunnel can be any one of the generally employed spraying methods of either the dry type or the wet type. Among them, the wet spraying method is preferred from the viewpoint of less dust generated.

In a case where the liquid quick-setting admixture is mixed in the cement concrete in the present invention, it is preferably mixed immediately before spraying. Specifically, it is preferable to add the liquid quick-setting admixture, the quick-setting aid and, if necessary another additive, to the cement concrete fed under pressure and to discharge the quick-setting cement concrete preferably within a period of ten seconds, more preferably within two seconds.

It is possible to improve the quick-setting property by admixing the quick-setting admixture of the present invention with the cement concrete preferably under heating in a temperature range of at least 20° C. and at most 90° C.

There are no particular restrictions on the slump value and flow value of the cement concrete for spraying of the present invention, and the cement concrete having any values can be employed as long as construction can be proceeded without any problem within the category of combination of known construction systems.

EXAMPLE 1

In a composition of cement/sand of 1/2.5 and W/C of 45%, 3 parts of calcium aluminate (hereinafter referred to as "CA") a was mixed relative to 100 parts of cement and a water-reducing agent was used, thereby obtaining a mortar in which a slump (SL) was adjusted to about 15 cm.

Relative to 100 parts of the cement in the mortar thus prepared, 10 parts of a liquid quick-setting admixture as shown in Table 1 was mixed and the mixture was packed into a framework. A proctor penetration resistance value of each sample was measured at a test ambient temperature of 20° C. Table 1 also shows the results.

For comparison, the same test as above was also carried out for a system without CAa.

<Materials Used>

Raw material A: aluminum source (aluminum sulfate octahydrate, Wako Pure Chemical Industries, Ltd., first-class reagent)

Raw material B: aluminum source (aluminum hydroxide, Wako Pure Chemical Industries, Ltd., first-class reagent)

Raw material C: aluminum source (sodium aluminate, Wako Pure Chemical Industries, Ltd., first-class reagent)

Raw material D: sulfur source (sulfuric acid, Wako Pure Chemical Industries, Ltd., first-class reagent)

Raw material E: fluorine source (calcium fluoride, Wako Pure Chemical Industries, Ltd., first-class reagent)

Raw material F: fluorine source (sodium fluoride, Wako Pure Chemical Industries, Ltd., first-class reagent)

Raw material G: fluorine source (aluminum fluoride, Wako Pure Chemical Industries, Ltd., first-class reagent)

Raw material H: fluorine source (potassium fluoride, Wako Pure-Chemical Industries, Ltd., first-class reagent)

Raw material I: fluorine source (cryolite, Wako Pure Chemical Industries, Ltd., first-class reagent)

Raw material J: alkanolamine (diethanolamine, Wako Pure Chemical Industries, Ltd., first-class reagent)

Raw material K: alkanolamine (N,N-dimethylethanolamine, Wako Pure Chemical Industries, Ltd., first-class reagent)

Raw material L: alkali metal source (sodium carbonate, Wako Pure Chemical Industries, Ltd., first-class reagent)

Raw material M: alkali metal source (potassium hydroxide, Wako Pure Chemical Industries, Ltd., first-class reagent)

Raw material N: alkali metal source (sodium hydroxide, Wako Pure Chemical Industries, Ltd., first-class reagent)

Raw material O: alkali metal source (sodium aluminate, Wako Pure Chemical Industries, Ltd., first-class reagent)

Liquid quick-setting admixture: obtained by mixing each of raw materials in an amount calculated to achieve an elemental composition as shown in Table 1, and by mixing and stirring 50 parts of the resultant mixture and 50 parts of water by a ball mill at 80° C. for 3 hours.

Cement: ordinary portland cement, commercial product, specific gravity: 3.16

CAa: CA, obtained by mixing a CaO raw material and an $Al_2O_3$ raw material at a molar ratio of 1:1, pulverizing the mixture, and calcining the resultant in an electric furnace at 1,350° C. for 3 hours; a Blaine value of 6,000 $cm^2/g$ Sand: river sand from Himegawa, Niigata Prefecture Water-reducing agent: polycarboxylic acid-type high-performance water-reducing agent (commercial product)

Water: tap water

<Measuring Method>

Proctor penetration resistance value: measured in accordance with JSCE D-102-1999, material age: ten minutes

EXAMPLE 2

The same operation as in Example 1 was carried out except that the liquid quick-setting admixture in Experiment No. 1-10 in Table 1 was used in the amounts as shown in Table 2 relative to 100 parts of the cement. Table 2 also shows the results.

EXAMPLE 3

The same operation as in Example 1 was carried out except that 0.3 part of a retarder and, CA, an alkali substance, calcium hydroxide and aluminum hydroxide as shown in Table 3 were used relative to 100 parts of the cement and that 10 parts of the liquid quick-setting admixture in Experiment No. 1-10 shown in Table 1 was used relative to 100 parts of the cement, thereby preparing a mortar. Table 3 also shows the results.

<Materials Used>

CA materials except for CAe were obtained by mixing and pulverizing raw materials at a predetermined ratio and calcining the mixture in an electric furnace at 1,350° C. for 3 hours, and were used herein. CAe was an amorphous product obtained by calcining a mixture of raw materials at 1,600° C. and cooling it quickly. The Blaine value of each material was adjusted to 6,000 $cm^2/g$.

CAb: $C_{12}A_7$, Blaine value: 6,000 $cm^2/g$

CAc: $C_{11}A_7.CaCl_2$, Blaine value: 6,000 $cm^2/g$

CAd: $C_3A$, Blaine value: 6,000 $cm^2/g$

CAe: $C_{12}A_7$ glass, Blaine value: 6,000 $cm^2/g$

Alkali substance A: sodium carbonate, Wako Pure Chemical Industries, Ltd., first-class reagent Alkali substance B: sodium aluminate, Wako Pure Chemical Industries, Ltd., first-class reagent Alkali substance C: potassium hydroxide, Wako Pure Chemical Industries, Ltd., first-class reagent Calcium hydroxide: Wako Pure Chemical Industries, Ltd., first-class reagent, Blaine value 13000 $cm^2/g$ Aluminum hydroxide: Wako Pure Chemical Industries, Ltd., first-class reagent, Blaine value 18000 $cm^2/g$ Retarder: sodium tartrate, Wako Pure Chemical Industries, Ltd., first-class reagent

EXAMPLE 4

The same operation as in Example 1 was carried out except that CSA was mixed in the amount as shown in Table 4 relative to 100 parts of the cement and that 10 parts of the liquid quick-setting admixture as shown in Table 4 was mixed relative to 100 parts of the cement in the mortar prepared. Table 4 also shows the results.

For comparison, the same operation as above was carried out for a system without CSA.

<Material Used>

CSA: haüyne, obtained by mixing a CaO raw material, an $Al_2O_3$ raw material and a $CaSO_4$ raw material at a molar ratio of 3:3:1, pulverizing the mixture, and calcining the resultant in an electric furnace at 1,350° C. for 3 hours. Blaine value: 4,000 $cm^2/g$

EXAMPLE 5

The same operation as in Example 4 was carried out except that the liquid quick-setting admixture in Experiment No. 4-10 in Table 4 was used in the amounts as shown in Table 5 relative to 100 parts of the cement. Table 5 also shows the results.

EXAMPLE 6

The same operation as in Example 1 was carried out except that 0.15 part of a retarder, and CSA, an alkali substance, calcium hydroxide and aluminum hydroxide as shown in Table 6 were used relative to 100 parts of the cement and that 10 parts of the liquid quick-setting admixture in Experiment No. 4-10 shown in Table 4 was used relative to 100 parts of the cement. Table 6 also shows the results.

<Materials Used>

Alkali substance A: sodium carbonate, Wako Pure Chemical Industries, Ltd., first-class reagent Alkali substance B: potassium aluminate, Wako Pure Chemical Industries, Ltd., first-class reagent Alkali substance C: potassium hydroxide, Wako Pure Chemical Industries, Ltd., first-class reagent Calcium hydroxide: Wako Pure Chemical Industries, Ltd., first-class reagent, Blaine value: 13000 $cm^2/g$ Aluminum hydroxide: Wako Pure Chemical Industries, Ltd., first-class reagent, Blaine value: 18000 $cm^2/g$ Retarder: sodium citrate, Wako Pure Chemical Industries, Ltd., first-class reagent

EXAMPLE 7

The same operation as in Example 6 was carried out except that 0.05 part of a retarder, and CAS, calcium hydroxide and calcium sulfate as shown in Table 7 were used relative to 100 parts of the cement. Table 7 also shows the results.

<Materials Used>

CASa: CaO: 45%, $Al_2O_3$: 42%, $SiO_2$: 13%, Blaine value: 5000 $cm^2/g$

CASb: CaO: 51%, $Al_2O_3$: 31%, $SiO_2$: 18%, Blaine value: 5000 $cm^2/g$

CASc: CaO: 41%, $Al_2O_3$: 37%, $SiO_2$: 22%, Blaine value: 5000 $cm^2/g$

Calcium hydroxide: Wako Pure Chemical Industries, Ltd., first-class reagent, Blaine value: 13000 $cm^2/g$ Calcium sulfate: natural anhydrous gypsum, Blaine value: 4,300 $cm^2/g$ Alkali substance: sodium carbonate, Wako Pure Chemical Industries, Ltd., first-class reagent Retarder: sodium gluconate, Wako Pure Chemical Industries, Ltd., first-class reagent

EXAMPLE 8

The same operation as in Example 1 was carried out except that 3 parts of calcium sulfate was used relative to 100 parts of the cement and that 10 parts of the liquid quick-setting admixture as shown in Table 8 was mixed relative to 100 parts of the cement in the mortar thus prepared, thereby measuring compressive strength. Table 8 also shows the results.

For comparison, the same operation as above was carried out for a system without calcium sulfate.

<Material Used>

Calcium sulfate: natural anhydrous gypsum, Blaine value: 4300 $cm^2/g$

<Measuring Method>

Compressive strength: measured in accordance with JIS R 5201, material age: 24 hours

EXAMPLE 9

The same operation as in Example 1 was carried out except that the liquid quick-setting admixture in Experiment No. 8-10 in Table 8 was used in the amounts as shown in Table 9 relative to 100 parts of the cement, thereby measuring a proctor penetration resistance value. Table 9 also shows the results.

EXAMPLE 10

The same operation as in Example 1 was carried out except that 0.3 part of a retarder, and calcium sulfate, calcium aluminate and an alkali substance were used in the amounts as shown in Table 10 relative to 100 parts of the cement and that 10 parts of the liquid quick-setting admixture in Experiment No. 8-10 in Table 8 was used relative to 100 parts of the cement. Table 10 also shows the results.

<Materials Used>

Calcium aluminate: composition: $C_{12}A_7$, amorphous, Blaine value: 6000 $cm^2/g$ Alkali substance: sodium aluminate, Wako Pure Chemical Industries, Ltd., first-class reagent Retarder: sodium tartrate, Wako Pure Chemical Industries, Ltd., first-class reagent

EXAMPLE 11

The same operation as in Example 1 was carried out except that an alkali substance was mixed in the amount as shown in Table 11 relative to 100 parts of the cement and that 10 parts of the liquid quick-setting admixture as shown in Table 11 was mixed relative to 100 parts of the cement in the mortar prepared. Table 11 also shows the results.

For comparison, the same operation as above was carried out for a system without the alkali substance.

<Material Used>

Alkali substance D: sodium aluminate, Wako Pure Chemical Industries, Ltd., first-class reagent

EXAMPLE 12

The same operation as in Example 1 was carried out except that the liquid quick-setting admixture in Experiment No. 11-10 in Table 11 was used in the amounts as shown in Table 12 relative to 100 parts of the cement. Table 12 also shows the results.

EXAMPLE 13

The same operation as in Example 1 was carried out except that 0.15 part of a retarder, and an alkali substance, calcium hydroxide, aluminum hydroxide and calcium sulfate as shown in Table 13 were used relative to 100 parts of cement and that 10 parts of the liquid quick-setting admixture in Experiment No. 11-10 in Table 11 was used relative to 100 parts of the cement. Table 13 also shows the results.

<Materials Used>

Alkali substance E: sodium silicate, Wako Pure Chemical Industries, Ltd., first-class reagent Retarder: citric acid, Wako Pure Chemical Industries, Ltd., first-class reagent Calcium hydroxide: Wako Pure Chemical Industries, Ltd., first-class reagent, Blaine value: 13000 $cm^2/g$ Aluminum hydroxide: Wako Pure Chemical Industries, Ltd., first-class reagent, Blaine value: 18000 $cm^2/g$ Calcium sulfate: anhydrous calcium sulfate, Wako Pure Chemical Industries, Ltd., first-class reagent, Blaine value: 7000 $cm^2/g$

EXAMPLE 14

The same operation as in Example 1 was carried out except that calcium hydroxide was mixed in the amount as shown in Table 14 relative to 100 parts of the cement and that 10 parts of the liquid quick-setting admixture as shown in Table 14 was mixed relative to 100 parts of the cement in the mortar prepared. Table 14 also shows the results.

For comparison, the same operation as above was carried out for a system without calcium hydroxide.

<Material Used>

Calcium hydroxide: Wako Pure Chemical Industries, Ltd., first-class reagent, Blaine value 13000 $cm^2/g$

EXAMPLE 15

The same operation as in Example 1 was carried out except that the liquid quick-setting admixture in Experiment No. 14-10 in Table 14 was used in the amounts as shown in Table 15 relative to 100 parts of the cement. Table 15 also shows the results.

EXAMPLE 16

The same operation as in Example 1 was carried out except that 0.15 part of a retarder, and calcium hydroxide, aluminum hydroxide and calcium sulfate as shown in Table 16 were used relative to 100 parts of the cement and that 10 parts of the liquid quick-setting admixture in Experiment No. 14-10 shown in Table 14 was used relative to 100 parts of the cement. Table 16 also shows the results.

<Materials Used>

Calcium hydroxide: Wako Pure Chemical Industries, Ltd., first-class reagent, Blaine value: 13000 $cm^2/g$ Aluminum hydroxide: Wako Pure Chemical Industries, Ltd., first-class reagent, Blaine value: 18000 $cm^2/g$ Calcium sulfate: natural anhydrous gypsum, Blaine value: 4300 $cm^2/g$ Retarder: sodium gluconate, Wako Pure Chemical Industries, Ltd., first-class reagent

INDUSTRIAL APPLICABILITY

The spraying material of the present invention has the excellent quick-setting property and adherability, the small alkali amount, and the excellent initial strength development. Therefore, by employing the spraying method using the material, it is feasible to securely prevent the falling of ground in excavation works of slopes or tunnels, such as road tunnels, railway tunnels or channel tunnels, and to prevent the risk of falling of the sprayed material in the case of heavy spraying.

Furthermore, the entire disclosure contents of the Japanese Patent Applications below, which are the bases of the priority claimed in the present application, are incorporated by reference herein as the disclosure of the present invention.

(1) Japanese Patent Application 2003-295994 (filed with the Japanese Patent Office on Aug. 20, 2003)

(1) Japanese Patent Application 2003-295995 (filed with the Japanese Patent Office on Aug. 20, 2003)

(1) Japanese Patent Application 2003-296169 (filed with the Japanese Patent Office on Aug. 20, 2003)

(1) Japanese Patent Application 2003-296170 (filed with the Japanese Patent Office on Aug. 20, 2003)

(1) Japanese Patent Application 2003-296171 (filed with the Japanese Patent Office on Aug. 20, 2003)

TABLE 1

| Experiment No. | Components of liquid quick-setting admixture: $Al_2O_3$ | $SO_3$ | F | Raw material J | Raw material L | Raw materials of liquid quick-setting admixture | CAa | Proctor penetration resistance ($N/mm^2$) | Notes |
|---|---|---|---|---|---|---|---|---|---|
| 1-1 | 0 | 100 | 15 | — | — | D, E | 3 | 2.9 | Comp. Ex. |
| 1-2 | 25 | 100 | 15 | — | — | A, D, E | 3 | 16.1 | P.I. |
| 1-3 | 60 | 100 | 15 | — | — | A, B, E | 3 | 18.1 | P.I. |
| 1-4 | 110 | 100 | 15 | — | — | A, B, E | 3 | 20.8 | P.I. |
| 1-5 | 60 | 100 | 0 | — | — | A, B | 3 | 4.5 | Comp. Ex. |
| 1-6 | 60 | 100 | 2 | — | — | A, B, E | 3 | 9.5 | P.I. |
| 1-3 | 60 | 100 | 15 | — | — | A, B, E | 3 | 18.1 | P.I. |
| 1-7 | 60 | 100 | 50 | — | — | A, B, E | 3 | 21.4 | P.I. |
| 1-8 | 60 | 0 | 15 | — | — | B, E | 3 | 4.4 | Comp. Ex. |
| 1-9 | 60 | 100 | 15 | — | — | A, B, E | 0 | 13.4 | Comp. Ex. |
| 1-10 | 60 | 100 | 15 | 10 | — | A, B, E, J | 3 | 21.0 | P.I. |
| 1-11 | 60 | 100 | 15 | 10 | 2 | A, B, E, J, L | 3 | 22.3 | P.I. |
| 1-12 | 60 | 100 | 15 | — | 15 | A, B, E, L | 3 | 20.2 | P.I. |
| 1-13 | 60 | 100 | 15 | 10 | 15 | A, B, E, J, L | 3 | 24.6 | P.I. |
| 1-14 | 60 | 100 | 15 | 10 | 50 | A, B, E, J, L | 3 | 26.1 | P.I. |

The amounts of the components in the liquid quick-setting admixture are based on parts, and the amount of CAa is based on parts relative to 100 parts of the cement;
Each of Experiment Nos. 1-10, 1-11, 1-13 and 1-14 employs 10 parts of raw material J in combination;
Each of Experiment Nos. 1-11 to 1-14 employs raw material L in combination and the amount of raw material L used is based on parts as $R_2O$ relative to 100 parts of $SO_3$.
Each of the liquid quick-setting admixtures has the pH of at most 6.
P.I.: Present Invention

TABLE 2

| Experiment No. | liquid quick-setting admixture | Proctor penetration resistance value ($N/mm^2$) | Notes |
|---|---|---|---|
| 2-1 | 5 | 5.1 | Present invention |
| 1-10 | 10 | 21.0 | Present invention |
| 2-2 | 15 | 30.7 | Present invention |

The amount of the liquid quick-setting admixture is based on parts relative to 100 parts of the cement.

TABLE 3

| Experiment No. | CA | | Alkali substance | | Calcium hydroxide | Aluminum hydroxide | Proctor penetration resistance value ($N/mm^2$) | Notes |
|---|---|---|---|---|---|---|---|---|
| 3-1 | — | 0 | — | 0.0 | 0.0 | 0.0 | 14.2 | Comp. Ex. |
| 3-2 | a | 1 | — | 0.0 | 0.0 | 0.0 | 16.3 | P.I. |
| 3-3 | a | 2 | — | 0.0 | 0.0 | 0.0 | 19.4 | P.I. |
| 1-10 | a | 3 | — | 0.0 | 0.0 | 0.0 | 21.0 | P.I. |
| 3-4 | a | 5 | — | 0.0 | 0.0 | 0.0 | 25.6 | P.I. |
| 3-5 | a | 10 | — | 0.0 | 0.0 | 0.0 | 30.9 | P.I. |
| 3-6 | a | 3 | A | 0.1 | 0.0 | 0.0 | 24.5 | P.I. |
| 3-7 | a | 3 | A | 0.3 | 0.0 | 0.0 | 27.8 | P.I. |
| 3-8 | a | 3 | A | 2.0 | 0.0 | 0.0 | 29.2 | P.I. |
| 3-9 | a | 3 | B | 0.3 | 0.0 | 0.0 | 27.3 | P.I. |
| 3-10 | a | 3 | C | 0.3 | 0.0 | 0.0 | 26.9 | P.I. |
| 3-11 | a | 3 | A | 0.3 | 0.5 | 0.0 | 28.5 | P.I. |
| 3-12 | a | 3 | A | 0.3 | 0.8 | 0.0 | 29.2 | P.I. |
| 3-13 | a | 3 | A | 0.3 | 3.0 | 0.0 | 30.6 | P.I. |
| 3-14 | a | 3 | A | 0.3 | 5.0 | 0.0 | 31.3 | P.I. |
| 3-15 | a | 3 | A | 0.3 | 0.0 | 0.5 | 29.2 | P.I. |
| 3-16 | a | 3 | A | 0.3 | 0.0 | 3.0 | 32.1 | P.I. |

TABLE 3-continued

| Experiment No. | CA | | Alkali substance | | Calcium hydroxide | Aluminum hydroxide | Proctor penetration resistance value ($N/mm^2$) | Notes |
|---|---|---|---|---|---|---|---|---|
| 3-17 | a | 3 | A | 0.3 | 1.5 | 1.5 | 31.4 | P.I. |
| 3-18 | b | 3 | A | 0.3 | 1.5 | 1.5 | 31.1 | P.I. |
| 3-19 | c | 3 | A | 0.3 | 1.5 | 1.5 | 29.5 | P.I. |
| 3-20 | d | 3 | A | 0.3 | 1.5 | 1.5 | 32.3 | P.I. |
| 3-21 | e | 3 | A | 0.3 | 1.5 | 1.5 | 33.5 | P.I. |

The amounts of CA, calcium hydroxide and aluminum hydroxide are based on parts relative to 100 parts of the cement, and the amount of the alkali substance used is based on parts as $R_2O$ relative to 100 parts of the cement.
P.I.: Present Invention

TABLE 4

| | Components of liquid quick-setting admixture | | | | | Raw materials of liquid | | Proctor penetration resistance | |
|---|---|---|---|---|---|---|---|---|---|
| Experiment No. | $Al_2O_3$ | $SO_3$ | F | Raw material J | Raw material L | quick-setting admixture | CSA | value ($N/mm^2$) | Notes |
| 4-1 | 0 | 100 | 15 | — | — | D, F | 3 | 2.1 | Comp. Ex. |
| 4-2 | 25 | 100 | 15 | — | — | A, D, F | 3 | 10.2 | P.I. |
| 4-3 | 60 | 100 | 15 | — | — | A, B, F | 3 | 20.4 | P.I. |
| 4-4 | 110 | 100 | 15 | — | — | A, B, F | 3 | 24.3 | P.I. |
| 4-5 | 60 | 100 | 0 | — | — | A, B | 3 | 6.6 | Comp. Ex. |
| 4-6 | 60 | 100 | 2 | — | — | A, B, F | 3 | 9.8 | P.I. |
| 4-3 | 60 | 100 | 15 | — | — | A, B, F | 3 | 20.4 | P.I. |
| 4-7 | 60 | 100 | 50 | — | — | A, B, F | 3 | 23.5 | P.I. |
| 4-8 | 60 | 0 | 15 | — | — | B, F | 3 | 5.4 | Comp. Ex. |
| 4-9 | 60 | 100 | 15 | — | — | A, B, F | 0 | 13.0 | Comp. Ex. |
| 4-10 | 60 | 100 | 15 | 10 | — | A, B, F, J | 3 | 24.7 | P.I. |
| 4-11 | 60 | 100 | 15 | 10 | 2 | A, B, F, J, L | 3 | 25.1 | P.I. |
| 4-12 | 60 | 100 | 15 | — | 15 | A, B, F, L | 3 | 23.3 | P.I. |
| 4-13 | 60 | 100 | 15 | 10 | 15 | A, B, F, J, L | 3 | 27.6 | P.I. |
| 4-14 | 60 | 100 | 15 | 10 | 50 | A, B, F, J, L | 3 | 30.2 | P.I. |

The amounts of the components in the liquid quick-setting admixture are based on parts, and the amount of CSA is based on parts relative to 100 parts of the cement;
Each of Experiment Nos. 4-10, 4-11, 4-13 and 4-14 employs 10 parts of raw material J in combination;
Each of Experiment Nos. 4-11 to 4-14 employs raw material L in combination;
The amount of raw material L used is based on parts as $R_2O$ relative to 100 parts of $SO_3$;
Each of the liquid quick-setting admixtures has the pH of at most 6.
P.I.: Present Invention

TABLE 5

| Experiment No. | liquid quick-setting admixture | Proctor penetration resistance value ($N/mm^2$) | Notes |
|---|---|---|---|
| 5-1 | 5 | 6.3 | Present Invention |
| 4-10 | 10 | 24.7 | Present Invention |
| 5-2 | 15 | 28.9 | Present invention |

The amount of the liquid quick-setting admixture is based on parts relative to 100 parts of the cement.

TABLE 6

| Experiment No. | CSA | Alkali substance | | Calcium hydroxide | Aluminum hydroxide | Proctor penetration resistance value ($N/mm^2$) | Notes |
|---|---|---|---|---|---|---|---|
| 6-1 | 1 | — | 0.0 | 0.0 | 0.0 | 24.8 | P.I. |
| 6-2 | 2 | — | 0.0 | 0.0 | 0.0 | 25.5 | P.I. |
| 6-3 | 10 | — | 0.0 | 0.0 | 0.0 | 28.9 | P.I. |
| 6-4 | 20 | — | 0.0 | 0.0 | 0.0 | 34.5 | P.I. |
| 6-5 | 3 | A | 0.05 | 0.0 | 0.0 | 28.1 | P.I. |
| 6-6 | 3 | A | 0.1 | 0.0 | 0.0 | 29.8 | P.I. |
| 6-7 | 3 | A | 2.0 | 0.0 | 0.0 | 31.1 | P.I. |
| 6-8 | 3 | A | 3.0 | 0.0 | 0.0 | 33.4 | P.I. |
| 6-9 | 3 | B | 0.3 | 0.0 | 0.0 | 30.8 | P.I. |
| 6-10 | 3 | C | 0.3 | 0.0 | 0.0 | 29.7 | P.I. |
| 6-11 | 3 | A | 0.3 | 3.0 | 0.0 | 31.2 | P.I. |

TABLE 6-continued

| Experiment No. | CSA | Alkali substance | | Calcium hydroxide | Aluminum hydroxide | Proctor penetration resistance value ($N/mm^2$) | Notes |
|---|---|---|---|---|---|---|---|
| 6-12 | 3 | A | 0.3 | 0.0 | 3.0 | 33.4 | P.I. |
| 6-13 | 3 | A | 0.3 | 1.5 | 1.5 | 32.3 | P.I. |

The amounts of CSA, calcium hydroxide and aluminum hydroxide are based on parts relative to 100 parts of the cement.
The amount of the alkali substance used is based on parts as $R_2O$ relative to 100 parts of the cement.
P.I.: Present Invention

TABLE 7

| Experiment No. | CAS | | Calcium hydroxide | Calcium sulfate | Alkali substance | Proctor penetration resistance value ($N/mm^2$) | Notes |
|---|---|---|---|---|---|---|---|
| 7-1 | a | 1 | 0.0 | 0.0 | 0.0 | 22.1 | P.I. |
| 7-2 | a | 3 | 0.0 | 0.0 | 0.0 | 23.7 | P.I. |
| 7-3 | a | 5 | 0.0 | 0.0 | 0.0 | 25.3 | P.I. |
| 7-4 | a | 15 | 0.0 | 0.0 | 0.0 | 30.5 | P.I. |
| 7-5 | a | 25 | 0.0 | 0.0 | 0.0 | 35.6 | P.I. |

TABLE 7-continued

| Experiment No. | CAS | | Calcium hydroxide | Calcium sulfate | Alkali substance | Proctor penetration resistance value ($N/mm^2$) | Notes |
|---|---|---|---|---|---|---|---|
| 7-6 | a | 5 | 0.5 | 0.0 | 0.0 | 26.1 | P.I. |
| 7-7 | a | 5 | 0.8 | 0.0 | 0.0 | 27.2 | P.I. |
| 7-8 | a | 5 | 1.5 | 0.0 | 0.0 | 28.9 | P.I. |
| 7-9 | a | 5 | 3.0 | 0.0 | 0.0 | 30.1 | P.I. |
| 7-10 | a | 5 | 5.0 | 0.0 | 0.0 | 33.5 | P.I. |
| 7-11 | a | 5 | 1.5 | 1.0 | 0.0 | 29.4 | P.I. |
| 7-12 | a | 5 | 1.5 | 1.5 | 0.0 | 30.3 | P.I. |
| 7-13 | a | 5 | 1.5 | 3.0 | 0.0 | 31.1 | P.I. |
| 7-14 | a | 5 | 1.5 | 5.0 | 0.0 | 28.5 | P.I. |
| 7-15 | a | 5 | 1.5 | 7.0 | 0.0 | 27.7 | P.I. |
| 7-16 | a | 5 | 1.5 | 3.0 | 0.05 | 32.2 | P.I. |
| 7-17 | a | 5 | 1.5 | 3.0 | 0.1 | 33.1 | P.I. |
| 7-18 | a | 5 | 1.5 | 3.0 | 0.3 | 34.5 | P.I. |
| 7-19 | a | 5 | 1.5 | 3.0 | 2.0 | 33.3 | P.I. |
| 7-20 | a | 5 | 1.5 | 3.0 | 3.0 | 31.1 | P.I. |
| 7-21 | b | 5 | 0.0 | 0.0 | 0.0 | 24.4 | P.I. |
| 7-22 | c | 5 | 0.0 | 0.0 | 0.0 | 23.1 | P.I. |

The amounts of CAS, calcium hydroxide and calcium sulfate are based on parts relative to 100 parts of the cement.
The amount of the alkali substance used is based on parts as $R_2O$ relative to 100 parts of the cement.
P.I.: Present Invention

TABLE 8

| Experiment. No. | Components of liquid quick-setting admixture: $Al_2O_3$ | $SO_3$ | F | Raw material J | Raw material M | Raw materials of liquid quick-setting admixture | Calcium sulfate | Proctor penetration resistance value ($N/mm^2$) | Compression strength | Note |
|---|---|---|---|---|---|---|---|---|---|---|
| 8-1 | 0 | 100 | 15 | — | — | D, G | 3 | 1.2 | 11.4 | Comp. Ex. |
| 8-2 | 25 | 100 | 15 | — | — | A, D, G | 3 | 7.6 | 13.9 | P.I. |
| 8-3 | 60 | 100 | 15 | — | — | A, B, G | 3 | 17.4 | 12.5 | P.I. |
| 8-4 | 110 | 100 | 15 | — | — | A, B, G | 3 | 18.1 | 11.1 | P.I. |
| 8-5 | 60 | 100 | 0 | — | — | A, B | 3 | 2.3 | 13.5 | Comp. Ex. |
| 8-6 | 60 | 100 | 2 | — | — | A, B, G | 3 | 6.9 | 13.1 | P.I. |
| 8-3 | 60 | 100 | 15 | — | — | A, B, G | 3 | 17.4 | 12.5 | P.I. |
| 8-7 | 60 | 100 | 50 | — | — | A, B, G | 3 | 18.5 | 9.8 | P.I. |
| 8-8 | 60 | 0 | 15 | — | — | B, G | 3 | 3.8 | 10.1 | Comp. Ex. |
| 8-9 | 60 | 100 | 15 | — | — | A, B, G | 0 | 13.5 | 5.2 | Comp. Ex. |
| 8-10 | 60 | 100 | 15 | 10 | — | A, B, G, J | 3 | 18.3 | 10.3 | P.I. |
| 8-11 | 60 | 100 | 15 | 10 | 2 | A, B, G, J, M | 3 | 20.1 | 9.9 | P.I. |
| 8-12 | 60 | 100 | 15 | — | 15 | A, B, G, M | 3 | 19.5 | 10.8 | P.I. |
| 8-13 | 60 | 100 | 15 | 10 | 15 | A, B, G, J, M | 3 | 22.7 | 8.8 | P.I. |
| 8-14 | 60 | 100 | 15 | 10 | 50 | A, B, G, J, M | 3 | 23.9 | 8.2 | P.I. |

The amounts of the components in the liquid quick-setting admixture are based on parts, and the amount of calcium sulfate is based on parts relative to 100 parts of the cement;
The proctor penetration resistance value and compression strength are based on $N/mm^2$;
Each of Experiment Nos. 8-10, 8-11, 8-13 and 8-14 employs 10 parts of raw material J in combination;
Each of Experiment Nos. 8-11 to 8-14 employs raw material M in combination;
The amount of raw material M used is based on parts as $R_2O$ relative to 100 parts of $SO_3$;
Each of the liquid quick-setting admixtures has the pH of at most 6.
P.I.: Present Invention

TABLE 9

| Experiment No. | liquid quick-setting admixture | Proctor penetration resistance value ($N/mm^2$) | Notes |
|---|---|---|---|
| 9-1 | 5 | 5.3 | Present Invention |
| 8-10 | 10 | 18.3 | Present Invention |
| 9-2 | 15 | 25.1 | Present Invention |

The amount of the liquid quick-setting admixture is based on parts relative to 100 parts of the cement.

TABLE 10

| Experiment No. | Calcium sulfate | Calcium aluminate | Alkali substance | Proctor penetration resistance value ($N/mm^2$) | Notes |
|---|---|---|---|---|---|
| 10-1 | 1.0 | 0.0 | 0.0 | 19.4 | P.I. |
| 10-2 | 1.5 | 0.0 | 0.0 | 19.1 | P.I. |
| 10-3 | 3.0 | 0.0 | 0.0 | 18.9 | P.I. |
| 10-4 | 5.0 | 0.0 | 0.0 | 18.5 | P.I. |
| 10-5 | 7.0 | 0.0 | 0.0 | 17.5 | P.I. |
| 10-6 | 3.0 | 1.0 | 0.0 | 20.1 | P.I. |
| 10-7 | 3.0 | 2.0 | 0.0 | 21.9 | P.I. |
| 10-8 | 3.0 | 3.0 | 0.0 | 23.3 | P.I. |
| 10-9 | 3.0 | 5.0 | 0.0 | 26.6 | P.I. |
| 10-10 | 3.0 | 10.0 | 0.0 | 30.3 | P.I. |
| 10-11 | 3.0 | 3.0 | 0.05 | 25.1 | P.I. |
| 10-12 | 3.0 | 3.0 | 0.1 | 27.2 | P.I. |
| 10-13 | 3.0 | 3.0 | 0.3 | 28.8 | P.I. |
| 10-14 | 3.0 | 3.0 | 2.0 | 29.3 | P.I. |
| 10-15 | 3.0 | 3.0 | 3.0 | 30.2 | P.I. |

The amounts of calcium sulfate and calcium aluminate are based on parts relative to 100 parts of the cement.
The amounts of the alkali substance used is based on parts as $R_2O$ relative to 100 parts of the cement.
P.I.: Present Invention

TABLE 12

| Experiment No. | liquid quick-setting admixture | Proctor penetration resistance value ($N/mm^2$) | Notes |
|---|---|---|---|
| 12-1 | 5 | 5.3 | Present Invention |
| 11-10 | 10 | 25.1 | Present Invention |
| 12-2 | 15 | 31.9 | Present Invention |

TABLE 13

| Experiment No. | Alkali substance | | Calcium hydroxide | Aluminum hydroxide | Calcium sulfate | Proctor penetration resistance value ($N/mm^2$) | Notes |
|---|---|---|---|---|---|---|---|
| 13-1 | D | 0.05 | 0.0 | 0.0 | 0.0 | 18.7 | P.I. |
| 13-2 | D | 0.1 | 0.0 | 0.0 | 0.0 | 20.1 | P.I. |
| 13-3 | D | 0.3 | 0.0 | 0.0 | 0.0 | 23.5 | P.I. |
| 13-4 | D | 3.0 | 0.0 | 0.0 | 0.0 | 24.2 | P.I. |
| 13-5 | E | 0.3 | 0.0 | 0.0 | 0.0 | 22.1 | P.I. |
| 13-6 | C | 0.3 | 0.0 | 0.0 | 0.0 | 21.4 | P.I. |
| 13-7 | D | 0.3 | 0.5 | 0.0 | 0.0 | 24.2 | P.I. |
| 13-8 | D | 0.3 | 0.8 | 0.0 | 0.0 | 25.3 | P.I. |
| 13-9 | D | 0.3 | 3.0 | 0.0 | 0.0 | 26.1 | P.I. |
| 13-10 | D | 0.3 | 5.0 | 0.0 | 0.0 | 25.7 | P.I. |
| 13-11 | D | 0.3 | 0.0 | 0.5 | 0.0 | 25.5 | P.I. |
| 13-12 | D | 0.3 | 0.0 | 0.8 | 0.0 | 27.8 | P.I. |
| 13-13 | D | 0.3 | 0.0 | 3.0 | 0.0 | 32.5 | P.I. |
| 13-14 | D | 0.3 | 0.0 | 5.0 | 0.0 | 34.8 | P.I. |
| 13-15 | D | 0.3 | 1.5 | 1.5 | 0.0 | 30.7 | P.I. |
| 13-16 | D | 0.3 | 1.5 | 1.5 | 1.0 | 31.4 | P.I. |
| 13-17 | D | 0.3 | 1.5 | 1.5 | 1.5 | 32.8 | P.I. |
| 13-18 | D | 0.3 | 1.5 | 1.5 | 4.0 | 32.2 | P.I. |

TABLE 11

| Experiment. No. | Components of liquid quick-setting admixture | | | | | Raw materials of liquid quick-setting admixture | Alkali substance | | Proctor penetration resistance value ($N/mm^2$) | Notes |
|---|---|---|---|---|---|---|---|---|---|---|
| | $Al_2O_3$ | $SO_3$ | F | Raw material J | Raw material N | | | | | |
| 11-1 | 0 | 100 | 15 | — | — | C, H | D | 0.3 | 1.9 | Comp. Ex. |
| 11-2 | 25 | 100 | 15 | — | — | A, D, H | D | 0.3 | 12.2 | P.I. |
| 11-3 | 60 | 100 | 15 | — | — | A, B, H | D | 0.3 | 21.6 | P.I. |
| 11-4 | 110 | 100 | 15 | — | — | A, B, H | D | 0.3 | 23.4 | P.I. |
| 11-5 | 60 | 100 | 0 | — | — | A, B | D | 0.3 | 4.2 | Comp. Ex. |
| 11-6 | 60 | 100 | 2 | — | — | A, B, H | D | 0.3 | 10.8 | P.I. |
| 11-3 | 60 | 100 | 15 | — | — | A, B, H | D | 0.3 | 21.6 | P.I. |
| 11-7 | 60 | 100 | 50 | — | — | A, B, H | D | 0.3 | 22.8 | P.I. |
| 11-8 | 60 | 0 | 15 | — | — | B, H | D | 0.3 | 3.3 | Comp. Ex. |
| 11-9 | 60 | 100 | 15 | — | — | A, B, H | — | 0.0 | 12.9 | Comp. Ex. |
| 11-10 | 60 | 100 | 15 | 10 | — | A, B, H, J | D | 0.3 | 25.1 | P.I. |
| 11-11 | 60 | 100 | 15 | 10 | 2 | A, B, H, J, N | D | 0.3 | 26.1 | P.I. |
| 11-12 | 60 | 100 | 15 | — | 15 | A, B, H, N | D | 0.3 | 24.3 | P.I. |
| 11-13 | 60 | 100 | 15 | 10 | 15 | A, B, H, J, N | D | 0.3 | 28.1 | P.I. |
| 11-14 | 60 | 100 | 15 | 10 | 50 | A, B, H, J, N | D | 0.3 | 31.1 | P.I. |

The amounts of the components in the liquid quick-setting admixture are based on parts and the amount of alkali substance is based on parts relative to 100 parts of the cement.;
The proctor penetration resistance value is based on $N/mm^2$;
Each of Experiment Nos. 11-10, 11-11, 11-13 and 11-14 employs 10 parts of raw material J in combination;
Each of Experiment Nos. 11-11 to 11-14 employs raw material N in combination and the amount of raw material N used is based on parts as $R_2O$ relative to 100 parts of $SO_3$;
Each of the liquid quick-setting admixtures has the pH of at most 6.
P.I.: Present Invention TABLE 13-continued

| Experiment No. | Alkali substance | | Calcium hydroxide | Aluminum hydroxide | Calcium sulfate | Proctor penetration resistance value ($N/mm^2$) | Notes |
|---|---|---|---|---|---|---|---|
| 13-19 | D | 0.3 | 1.5 | 1.5 | 5.0 | 31.0 | P.I. |
| 13-20 | D | 0.3 | 1.5 | 1.5 | 7.0 | 30.1 | P.I. |

The amounts of calcium hydroxide, aluminum hydroxide and calcium sulfate are based on parts.
The amount of the alkali substance used is based on parts as $R_2O$ relative to 100 parts of the cement.
P.I.: Present Invention TABLE 16-continued

| Experiment No. | Calcium hydroxide | Aluminum hydroxide | Calcium sulfate | Proctor penetration resistance value ($N/mm^2$) | Notes |
|---|---|---|---|---|---|
| 16-3 | 3.0 | 0.0 | 0.0 | 24.1 | P.I. |
| 16-4 | 5.0 | 0.0 | 0.0 | 25.1 | P.I. |
| 16-5 | 0.0 | 0.5 | 0.0 | 16.2 | P.I. |
| 16-6 | 0.0 | 0.8 | 0.0 | 19.4 | P.I. |
| 16-7 | 0.0 | 3.0 | 0.0 | 26.8 | P.I. |
| 16-8 | 0.0 | 5.0 | 0.0 | 27.8 | P.I. |
| 16-9 | 3.0 | 3.0 | 0.0 | 28.5 | P.I. |

TABLE 14

| Experiment. No. | Components of liquid quick-setting admixture | | | | | Raw materials of liquid quick-setting admixture | Calcium hydroxide | Proctor penetration resistance value ($N/mm^2$) | Notes |
|---|---|---|---|---|---|---|---|---|---|
| | $Al_2O_3$ | $SO_3$ | F | Raw material K | Raw material O | | | | |
| 14-1 | 0 | 100 | 15 | — | — | D, I | 3 | 1.2 | Comp. Ex. |
| 14-2 | 25 | 100 | 15 | — | — | A, D, I | 3 | 9.1 | P.I. |
| 14-3 | 60 | 100 | 15 | — | — | A, B, I | 3 | 18.5 | P.I. |
| 14-4 | 110 | 100 | 15 | — | — | A, B, I | 3 | 21.2 | P.I. |
| 14-5 | 60 | 100 | 0 | — | — | A, B | 3 | 5.1 | Comp. Ex. |
| 14-6 | 60 | 100 | 2 | — | — | A, B, I | 3 | 8.2 | P.I. |
| 14-3 | 60 | 100 | 15 | — | — | A, B, I | 3 | 18.5 | P.I. |
| 14-7 | 60 | 100 | 50 | — | — | A, B, I | 3 | 19.3 | P.I. |
| 14-8 | 60 | 0 | 15 | — | — | B, I | 3 | 4.2 | Comp. Ex. |
| 14-9 | 60 | 100 | 15 | — | — | A, B, I | 0 | 13.3 | Comp. Ex. |
| 14-10 | 60 | 100 | 15 | 10 | — | A, B, I, K | 3 | 22.1 | P.I. |
| 14-11 | 60 | 100 | 15 | 10 | 2 | A, B, I, K, O | 3 | 23.3 | Present Invention |
| 14-12 | 60 | 100 | 15 | — | 15 | A, B, I, K, O | 3 | 21.3 | Present Invention |
| 14-13 | 60 | 100 | 15 | 10 | 15 | A, B, I, K, O | 3 | 25.5 | Present Invention |
| 14-14 | 60 | 100 | 15 | 10 | 50 | A, B, I, K, O | 3 | 27.1 | Present Invention |

The amounts of the components in liquid quick-setting admixture are based on parts;
Each of Experiment Nos. 14-10, 14-11, 14-13 and 14-14 employs 10 parts of raw material K in combination;
Each of Experiment Nos. 14-11 to 14-14 employs raw material O in combination and the amount of raw material O used is based on parts as $R_2O$ relative to 100 parts of $SO_3$;
Each of the liquid quick-setting admixtures has the pH of at most 6.
P.I.: Present Invention

TABLE 15

| Experiment No. | liquid quick-setting admixture | Proctor penetration resistance value ($N/mm^2$) | Notes |
|---|---|---|---|
| 15-1 | 5 | 6.0 | Present Invention |
| 14-10 | 10 | 22.1 | Present Invention |
| 15-2 | 15 | 29.5 | Present Invention |

The amount of the liquid quick-setting admixture is based on parts relative to 100 parts of the cement.

TABLE 16

| Experiment No. | Calcium hydroxide | Aluminum hydroxide | Calcium sulfate | Proctor penetration resistance value ($N/mm^2$) | Notes |
|---|---|---|---|---|---|
| 16-1 | 0.5 | 0.0 | 0.0 | 15.7 | P.I. |
| 16-2 | 0.8 | 0.0 | 0.0 | 17.1 | P.I. |

TABLE 16-continued

| Experiment No. | Calcium hydroxide | Aluminum hydroxide | Calcium sulfate | Proctor penetration resistance value ($N/mm^2$) | Notes |
|---|---|---|---|---|---|
| 16-10 | 3.0 | 3.0 | 1.0 | 29.2 | P.I. |
| 16-11 | 3.0 | 3.0 | 1.5 | 30.1 | P.I. |
| 16-12 | 3.0 | 3.0 | 5.0 | 32.5 | P.I. |
| 16-13 | 3.0 | 3.0 | 7.0 | 31.6 | P.I. |

The amounts of calcium hydroxide, aluminum hydroxide and calcium sulfate are based on parts relative to 100 parts of the cement.
P.I.: Present Invention

The invention claimed is:

1. A spraying material comprising: (i) a liquid quick-setting admixture containing comprising an aluminum source, a sulfur source and a fluorine source; (ii) one or more quick-setting aids selected from the group consisting of calcium aluminate, calcium sulfoaluminate, calcium aluminosilicate, an alkali metal-containing substance, calcium hydroxide and aluminum hydroxide; and (iii) a cement concrete, wherein the aluminum and sulfur sources of the liquid quick-setting admixture and the quick-setting aid are different.

2. The spraying material according to claim 1, wherein the aluminum source in the liquid quick-setting admixture is contained in an amount of from 25 to 110 parts as $Al_2O_3$ relative to 100 parts of the sulfur source as $SO_3$.

3. The spraying material according to claim 1, wherein the fluorine source in the liquid quick-setting admixture is contained in an amount of from 2 to 50 parts as F relative to 100 parts of the sulfur source as $SO_3$.

4. The spraying material according to claim 1, wherein the liquid quick-setting admixture further comprises an alkanolamine.

5. The spraying material according to claim 4, wherein the alkanolamine is contained in an amount of from 1 to 30 parts relative to 100 parts of the sulfur source as $SO_3$.

6. The spraying material according to claim 1, wherein the liquid quick-setting admixture further comprises an alkali metal source.

7. The spraying material according to claim 6, wherein the alkali metal source is contained in an amount of from 2 to 50 parts as $R_2O$, where R represents an alkali metal, relative to 100 parts of the sulfur source as $SO_3$.

8. The spraying material according to claim 1, wherein the liquid quick-setting admixture has a pH of at most 6.

9. The spraying material according to claim 1, wherein the liquid quick-setting admixture is used in an amount of from 5 to 15 parts relative to 100 parts of the cement in the cement concrete.

10. The spraying material according to claim 1, wherein the quick-setting aid is used in an amount of from 0.05 to 25 parts relative to 100 parts of the cement in the cement concrete.

11. The spraying material according to claim 1, wherein the quick-setting aid has a Blaine specific surface area of at least 2000 $cm^2/g$.

12. The spraying material according to claim 1, wherein calcium sulfoaluminate as the quick-setting aid comprises from 30 to 50 parts of CaO, from 40 to 60 parts of $Al_2O_3$ and from 5 to 20 parts of $SO_3$.

13. The spraying material according to claim 1, wherein calcium aluminosilicate as the quick-setting aid comprises from 20 to 60 parts of CaO, from 2 to 60 parts of $Al_2O_3$ and from 6 to 50 parts of $SiO_2$.

14. The spraying material according to claim 1, further comprising calcium sulfate.

15. The spraying material according to claim 14, wherein calcium sulfate is contained in an amount of from 1 to 7 parts relative to 100 parts of the cement in the cement concrete.

16. The spraying material according to claim 1, further comprising a retarder.

17. The spraying material according to claim 16, wherein the retarder is contained in an amount of from 0.05 to 5 parts relative to 100 parts of the cement in the cement concrete.

18. A spraying method using the spraying material as defined in claim 1, comprising adding the liquid quick-setting admixture and the quick-setting aid, and calcium sulfate as the case requires, to the cement concrete fed under a pressure effective for spraying, and spraying the mixture.

19. A spraying method using the spraying material as defined in claim 1, comprising preliminarily admixing the quick-setting aid, and calcium sulfate as the case requires, with the cement concrete, adding the liquid quick-setting admixture to the cement concrete fed under a pressure effective for spraying, and spraying the mixture.

20. The spraying material according to claim 1, comprising at least two quick-setting aids (ii) selected from the group consisting of calcium aluminate, calcium sulfoaluminate, calcium aluminosilicate, an alkali metal-containing substance, calcium hydroxide and aluminum hydroxide.

* * * * *

UNITED STATES PATENT AND TRADEMARK OFFICE

CERTIFICATE OF CORRECTION

PATENT NO. : 7,618,490 B2
APPLICATION NO. : 10/557204
DATED : November 17, 2009
INVENTOR(S) : Yasuhiro Nakashima et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 927 days.

Signed and Sealed this
Eighth Day of March, 2011

David J. Kappos
*Director of the United States Patent and Trademark Office*